US009877238B2

(12) United States Patent
Wei et al.

(10) Patent No.: US 9,877,238 B2
(45) Date of Patent: Jan. 23, 2018

(54) INTERWORKING AMONG DISSIMILAR RADIO NETWORKS (71) Applicant: Avago Technologies General IP (Singapore) Pte. Ltd., Singapore (SG)

(72) Inventors: Na Wei, Beijing (CN); Wei Hong, Beijing (CN); Erlin Zeng, Beijing (CN); Haiming Wang, Beijing (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/761,421

(22) PCT Filed: Jan. 18, 2013

(86) PCT No.: PCT/CN2013/070706
§ 371 (c)(1),
(2) Date: Jul. 16, 2015

(87) PCT Pub. No.: WO2014/110803
PCT Pub. Date: Jul. 24, 2014

(65) Prior Publication Data
US 2015/0358877 A1  Dec. 10, 2015

(51) Int. Cl.
*H04W 36/00* (2009.01)
*H04W 84/12* (2009.01)
*H04W 36/14* (2009.01)

(52) U.S. Cl.
CPC ... *H04W 36/0072* (2013.01); *H04W 36/0016* (2013.01); *H04W 36/14* (2013.01); *H04W 84/12* (2013.01)

(58) Field of Classification Search
CPC .... H04B 1/48; H04B 15/00; H04B 2001/485; H04B 1/1027; H04B 1/406; H04B 1/525;
(Continued)

(56) References Cited

U.S. PATENT DOCUMENTS 8,213,382 B2 * 7/2012 Sachs .................... H04W 36/14
370/331
2005/0202823 A1 * 9/2005 Shaheen ........... H04W 36/0061
455/436

(Continued)

FOREIGN PATENT DOCUMENTS

| CN | 1257634 | 6/2000 |
| CN | 1829193 | 9/2006 |
| CN | 102647763 | 8/2012 |

OTHER PUBLICATIONS

International Search Report for PCT/CN2013/070706 dated Oct. 31, 2013.
(Continued)

*Primary Examiner* — Jung-Jen Liu
(74) *Attorney, Agent, or Firm* — Foley & Lardner LLP (57) ABSTRACT Embodiments of the invention provide a method, apparatus and computer readable memory for controlling a user equipment (UE), comprising receiving at the UE on a first radio access technology (RAT) from a first access node radio resource control information for a second RAT. Then the UE performs at least one of a) uses the received radio resource control information to configure or reconfigure a module of the UE for communicating on the second RAT, and b) uses the module of the UE to report the received radio resource control information on the second RAT to a second access node.

20 Claims, 5 Drawing Sheets (58) Field of Classification Search
CPC ........... H04W 72/0473; H04W 76/048; H04W 88/06; H04W 4/008; H04W 52/244
See application file for complete search history.

(56) References Cited

U.S. PATENT DOCUMENTS

| | | | |
|---|---|---|---|
| 2006/0276190 A1 | 12/2006 | Shaheen | |
| 2007/0184835 A1* | 8/2007 | Bitran | H04W 48/04 455/434 |
| 2007/0230401 A1* | 10/2007 | Rayzman | H04W 36/18 370/331 |
| 2008/0014957 A1* | 1/2008 | Ore | H04W 36/0088 455/452.1 |
| 2008/0102815 A1* | 5/2008 | Sengupta | H04W 36/24 455/424 |
| 2010/0299419 A1* | 11/2010 | Ramankutty | H04W 24/02 709/221 |
| 2011/0222523 A1 | 9/2011 | Fu et al. | |
| 2011/0243047 A1* | 10/2011 | Dayal | H04W 16/14 370/311 |
| 2011/0319072 A1* | 12/2011 | Ekici | H04W 48/18 455/426.1 |
| 2012/0040620 A1* | 2/2012 | Fu | H04B 1/1027 455/63.1 |
| 2012/0040674 A1 | 2/2012 | McGilly et al. | |
| 2012/0127890 A1* | 5/2012 | Islam | G01S 5/0205 370/252 |
| 2012/0178448 A1 | 7/2012 | Yuk et al. | |
| 2013/0083783 A1* | 4/2013 | Gupta | H04W 28/0215 370/338 |
| 2013/0088983 A1* | 4/2013 | Pragada | H04W 16/14 370/252 |
| 2013/0223335 A1* | 8/2013 | Kwag | H04W 48/18 370/328 |
| 2014/0369198 A1* | 12/2014 | Rinne | H04W 40/02 370/235 |

OTHER PUBLICATIONS

Written Opinion for PCT/CN2013/070706 dated Oct. 31, 2013.
International Preliminary Report on Patentability for PCT/CN2013/070706 dated Jul. 21, 2015.
Office Action for German Patent Application No. 11 2013 006 450.2. dated Dec. 15, 2016, 8 pages.

* cited by examiner

Table 10-19a—VHT BSS operating channel width

| HT Operation element STA Channel Width field | VHT Operation element Channel Width field | BSS operating channel width |
|---|---|---|
| 0 | 0 | 20 MHz |
| 1 | 0 | 40 MHz |
| 1 | 1 | 80 MHz |
| 1 | 2 | 160 MHz |
| 1 | 3 | 80+80 MHz |

INTERWORKING AMONG DISSIMILAR RADIO NETWORKS

RELATED APPLICATION

This application is the U.S. National Stage of and claims priority to and the benefit of International Application Number PCT/CN2013/070706 filed Jan. 18, 2013. The entire contents of the foregoing are hereby incorporated herein by reference for all purposes.

TECHNICAL FIELD

The exemplary and non-limiting embodiments of this invention relate generally to wireless communication systems, methods, devices and computer programs and, more specifically, relate to radio resource management for different interworked networks such as a 3GPP cellular network which offloads traffic to a wireless local area network WLAN, which in the examples herein are controlled by the same operator. Different networks refer to dissimilar radio access technologies (RATs), not merely different versions of the same RAT family but RATs from altogether different access technology families.

BACKGROUND

The volume of wireless traffic and the number of wireless devices engaging in such traffic continues to increase. Cellular network operators are exploring many options to deal with this increased traffic given there is a finite amount of available bandwidth. One approach which has been studied quite extensively is offloading traffic to a 'small cell', which is a network access node that due to its lesser transmit power operates over a smaller geographic area than a conventional macro cell.

Many of these traffic offloading proposals have the small cell operating on a different radio protocol than the cellular macro cell, such as for example IEEE 802.11 wireless local access network WLAN protocols. In this case WLAN is integrated as a separate access network to the third generation partnership project evolved packet core (3GPP EPC). This requires extra cost of deploying the complete WLAN access network and also impacts the network entities in the 3GPP core network. Many WLAN offload solutions are based on this deployment model of distinct 3GPP and WLAN access networks using a common core with selective switching of flows based on operator/user policies. However, there is a general view that the operator does not have enough control on the WLAN usage and the WLANs deployed by cellular network operators have typically resulted in a very low utilization rate. Yet the load in 3GPP networks is overwhelmingly increasing and so the need remains to resolve this issue.

SUMMARY

In a first exemplary aspect of the invention there is a method for controlling a user equipment (UE). In this aspect the method comprises: receiving at the UE on a first radio access technology (RAT) from a first access node radio resource control information for a second RAT. The method further comprises at least one of: a) using the received radio resource control information to configure or reconfigure a module of the UE for communicating on the second RAT; and b) using the module of the UE to report the received radio resource control information on the second RAT to a second access node.

In a second exemplary aspect of the invention there is an apparatus for controlling a user equipment. In this aspect the apparatus comprises a processing system, and the processing system comprises at least one processor and a memory storing a set of computer instructions. The processing system is configured to cause the apparatus at least to: receive at the UE on a first radio access technology (RAT) from a first access node radio resource control information for a second RAT. The processing system is configured to further cause the apparatus to perform at least one of: a) use the received radio resource control information to configure or reconfigure a module of the UE for communicating on the second RAT; and b) use the module of the UE to report the received radio resource control information on the second RAT to a second access node.

In a third exemplary aspect of the invention there is a computer readable memory tangibly storing a set of computer executable instructions for controlling a user equipment (UE). In this aspect the set of computer executable instructions comprises: code for receiving at the UE on a first radio access technology (RAT) from a first access node radio resource control information for a second RAT; and further comprises code for performing at least one of: a) using the received radio resource control information to configure or reconfigure a module of the UE for communicating on the second RAT; and b) using the module of the UE to report the received radio resource control information on the second RAT to a second access node.

These and other aspects are detailed below with more particularity.

DETAILED DESCRIPTION

The examples detailed herein are in the context of a macro cell operating with 3GPP cellular technology and a second radio access point operating with WLAN as the radio access technology. 3GPP includes Universal Terrestrial Radio Access Network (UTRAN) as well as evolved UTRAN (E-UTRAN, sometimes referred to as long term evolution or LTE). But that is only to provide a practical context to describing the inventive concepts; these teachings may be utilized with other disparate pairs of radio access technologies (RATs) among the macro and the second access point without departing from the principles set forth herein for interworking between them.

The term 'WiFi' generally refers to a range of connectivity technologies including wireless local area network (WLAN) based on the IEEE 802.11 family of wireless standards operating in the 2.4, 3.6 and 5 GHz frequency bands. These are in the license-exempt radio spectrum sometimes referred to as the industrial, scientific and medical (ISM) band, and so are not fully controlled by any individual operator as is the case with traditional cellular frequencies. Specifically, IEEE 802.11b and 802.11g/n are RATs used in the 2.4 GHz ISM band while IEEE 802.11 a/n/ac are RATs used in the 5 GHz ISM band.

Figure 1:
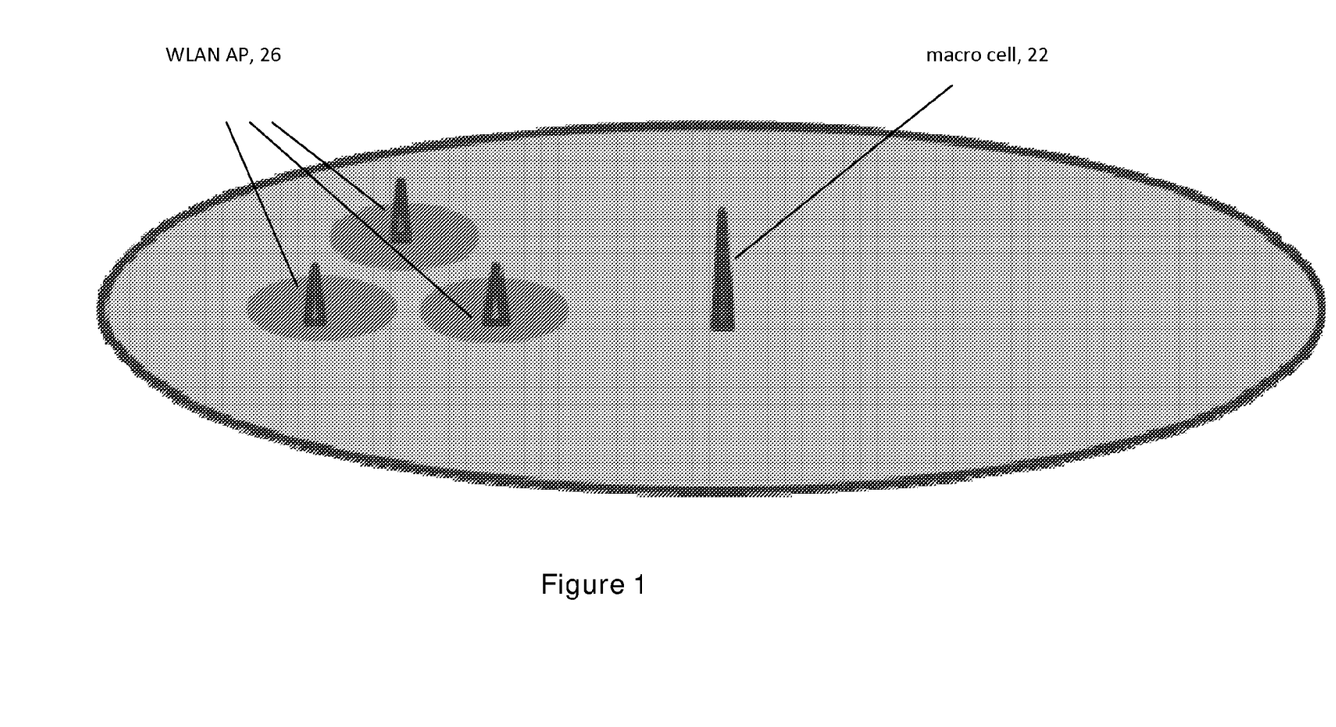
FIG. 1 is a schematic view of a radio environment in which these teachings may be practiced to advantage, wherein there are one or more WLAN APs operating within the coverage area of a conventional cellular macro cell and all are operated or otherwise controlled for interworking/RRM purposes by the same network operator.
Figure 6:
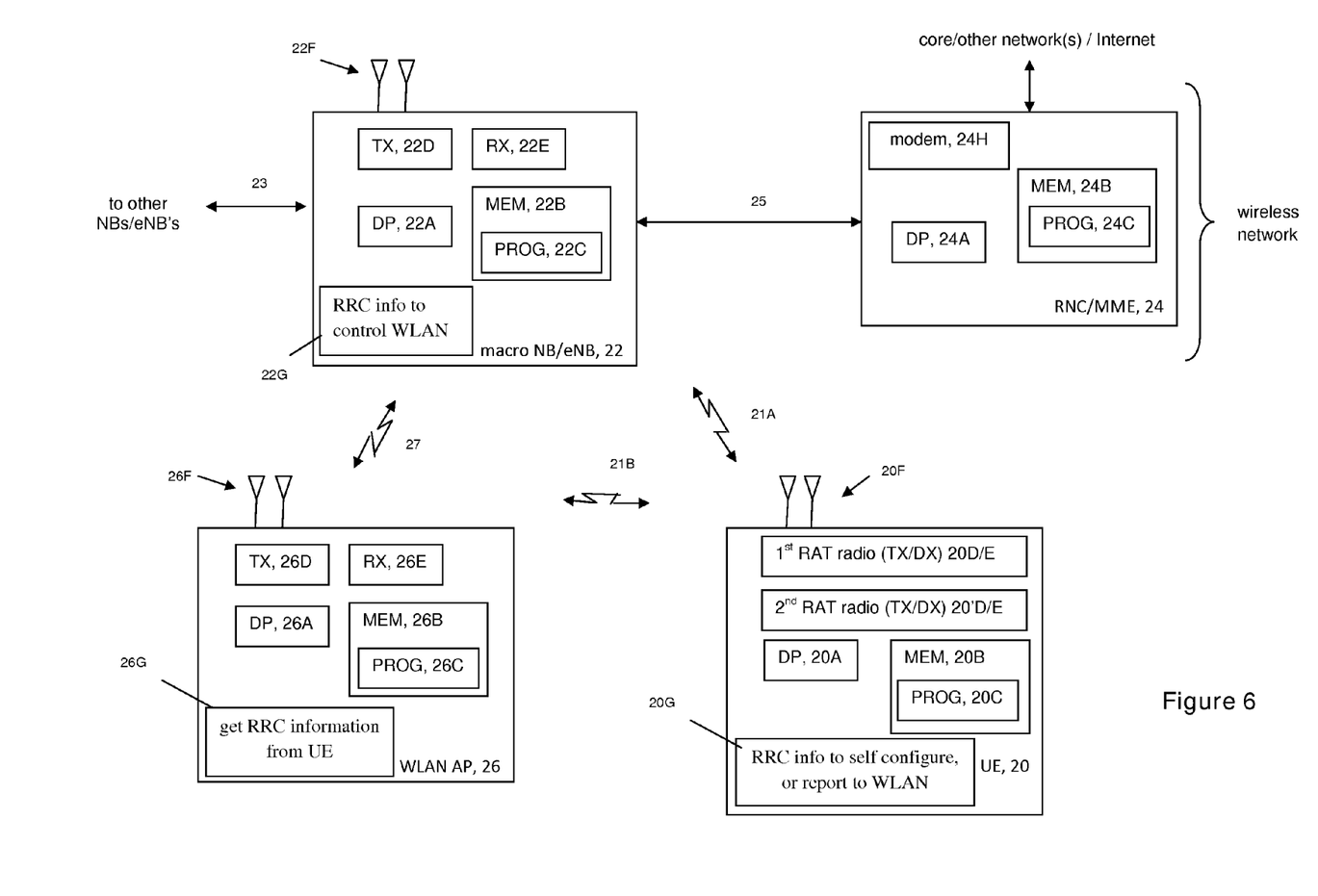
FIG. 6 is a simplified block diagram of a UE, a small cell WLAN AP, and a cellular network represented by a NB or eNB and by a RNC or MME, which are exemplary electronic devices suitable for use in practicing the exemplary embodiments of the invention.

The 3GPP has a study item set forth at document RP-121455 by Intel and entitled NEW STUDY ITEM PROPOSAL ON WLAN/3GPP RADIO INTERWORKING [RAN #57, September 2012] sets forth an objective to evaluate LTE-WLAN and UTRA-WLAN interworking procedures to improve WLAN utilization more efficiently with RAN level improvements. This study is to apply only to WLAN access points (APs) deployed and controlled by cellular operators, and this control may be direct or through partners of the cellular operators. FIG. 1 illustrates one typical scenario for the operator-deployed WLAN APs (the second access point 26) providing wireless coverage over some hotspot area, where those few WLAN APs are operated by and within the larger coverage area of a macro eNB 22. There may or may not be a backhaul connection from the second APs to the macro eNB; for completeness an example wireless backhaul link 27 is shown at FIG. 6.

Since the examples below present interworking between 3GPP and WLAN RATs, it is advantageous to review some principles for WLAN operation as currently set forth in IEEE standards. IEE 802.11n supports 20M mode, 40M mode, and 20/40M mode. The primary channel is 20 MHz wide, and another secondary channel can be used based on the network configuration so one WLAN can support a total of 40 MHz bandwidth. 802.11n further provides for static and dynamic configuration of the channel bandwidth. For example, if the WLAN is configured as static 40M the WLAN will only transmit if both the primary and the secondary channels are idle; whereas if configured as dynamic 20/40M the WLAN can adapt to use 20 MHz which it will do only if the secondary channel is busy.

Figure 2:
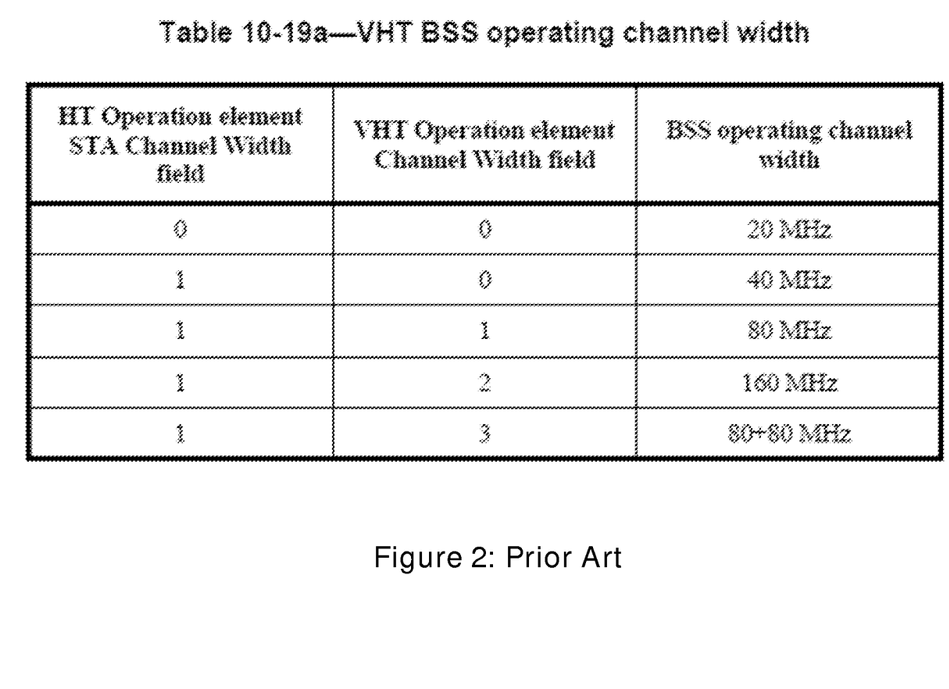
FIG. 2 is a prior art table summarizing channel widths in a WLAN basic service set for various combinations of bit values in channel width fields in the IEEE 802.11ac radio access technology.

The IEEE 802.11ac standard is tailored towards very high throughput (VHT) APs and stations (STAs) and supports even wider bandwidths; 40M, 80M, and 160M (or 80+80M non-adjacent channels) are defined as new possible channel bandwidths as shown in the prior art FIG. 2 which shows the VHT basic service set BSS operating channel widths in 802.11ac. FIG. 2 is reproduced from Table 10-19a of IEEE P802.11AC™/D2.0, PART 11: WIRELESS LAN MEDIUM ACCESS CONTROL (MAC) AND PHYSICAL LAYER (PHY) SPECIFICATIONS—AMENDMENT 4: ENHANCEMENTS FOR VERY HIGH THROUGHPUT FOR OPERATION IN BANDS BELOW 6 GHZ.

To make interworking of 3GPP with WLAN more effective than past solutions, it is important to perform radio resource control in the WLAN system more efficiently to take advantage of the increased capabilities and throughputs that are enabled by the above channel allocations. This is because the WLAN systems are becoming so much more dynamic than past iterations, for example bandwidth allocation, multiple-input/multiple output (MIMO) options, and other radio techniques that have been successfully deployed in cellular RATs. These dynamically changing radio configurations also entail different levels of power consumption so there is quite a bit of coordination needed between the 3GPP and the WLAN systems in order to interwork and offload traffic efficiently.

From FIG. 1 it is clear that the macro eNB 22 is in the better position to gather information (directly or indirectly) from all of the WLAN APs operating within its coverage area in that example deployment. The macro eNB 22 is also likely it have LTE side information such as load, number of user equipments (UEs) in service, etc. This more complete knowledge of the relevant information on both the LTE and WLAN sides makes the macro eNB in the position to help make efficient resource control/balancing for any LTE small cell and/or WLAN APs within its coverage area, and so the macro eNB 22 can improve the network operator's radio resource management for future mixed networks such as is shown at FIG. 1. As noted above, the examples herein assume the same cellular operator controls both the macro/cellular cell and the relevant small/WLAN cell or cells, either directly or through a partner operator via some joint interworking agreement.

The IEEE 11k specification provides some radio resource management (RRM) capability for WLAN APs. The inventors have considered an implementing algorithm to slowly adapt the radio resource of the WLAN, but this technique is seen to have inherent drawbacks in WLAN and 3GPP interworking scenarios. This is because the LTE macro eNB knows both sides' information over a large geographic area, while any given WLAN AP/STA can be expected to know much less if any since all or most of the relevant information by which to make efficient RRM decisions will be from the cellular operator's core network. This follows the analysis above that it is the macro eNB which is in the information-rich position to handle radio resource control for the WLAN APs under its operator's control.

There has been much research into a macro eNB assisting small LTE cells but as of yet no standardized solution has not been agreed as to how this assistance is to take place. Another proposal is to impose an X3 interface between the macro eNB 22 and the WLAN AP 26, similar to the X2 interface between neighbor eNBs in the E-UTRAN system. But even if adopted such an X3 interface may not always and everywhere be available since it implies a high cost to the network operators for backhaul, and if it is there may be latency or capacity issues similar to those that sometimes arise with the X2 interface. Embodiments of these teachings do not rely on the presence of an X3 interface or other direct communication interface between the macro eNB and the small WLAN cell, and some embodiments of these teachings are fully backward compatible with existing infrastructure/WLAN APs with only software/firmware updates to enable implementation.

According to exemplary embodiments of these teachings the macro cellular access node 22 uses a UE to communicate WLAN radio resource management information to the second access node 26, and so implementing these teachings does not require an X3 or other direct interface between the macro cell and the second node.

In more general terms the macro cell 22 can be referred to as the first access node operating with a first radio access technology and the second access node 26 operating with a second radio access technology, which is in a different RAT family than the first RAT (e.g., both the first and second RAT could be two different RAT's from any of the IEEE 802.11 family of radio protocols, the universal terrestrial access network (UTRAN) family, the evolved UTRAN (E-UTRAN) family, the global system for mobile communications (GSM) enhanced data rates for GSM evolution (EDGE) radio access network (GERAN) family, the worldwide interoperability of microwave access (Wimax) family, or the Bluetooth family, etc). Moreover, the first RAT could be a $3^{rd}$ Generation Partnership Project (3GPP) RAT and the second RAT a non-3GPP RAT. The UE 20 will then have two radios, which may be implemented using some shared hardware but which one of ordinary skill would recognize as different transmit and receive chains to enable communication on the different RATs. At least the WLAN radio is sometimes referred to as a module. The examples below use E-UTRAN/LTE (or generally 3GPP refers to E-UTRAN and UTRAN) for the macro cell and WLAN for the second RAT node without loss of generality.

Further, each of the examples below encompasses a single UE 20. To clearly delineate which RAT that UE 20 is communicating on for a given step or message, it is referred to as the LTE UE when using the first RAT/cellular system to communicate with the LTE eNB 22; and as the WLAN station (STA) when communicating on the second RAT/WLAN with the AP 26. Communications internal of the UE 20 between its WLAN module and its LTE radio are internal and so typically would not use a RAT air interface protocol. 3GPP members seeking solutions according to the above-referenced study item of document RP-121455 generally agree that this intra-UE communication between the LTE and WLAN sides of the same UE are implementation specific and may even vary among different UE manufacturers due to different considerations for in-device interference. Therefore, specific implementation of these UE-internal coordination communications are not explored here further.

One substantial benefit of these teachings is to improve the efficiency of resource handling on the WLAN side in the 3GPP-WLAN interworking for the case where an X3 interface is not available. The UE 20 is connected both to the LTE access node/eNB 22 and to the WLAN AP 26 to assist with WLAN radio resource management. The LTE eNB 26 can signal assistance information and/or resource control commands to the UE's LTE radio, and the UE's WLAN module/radio can enable reconfiguration in the WLAN side, and/or report those information/commands back to the WLAN APs.

Figure 3:
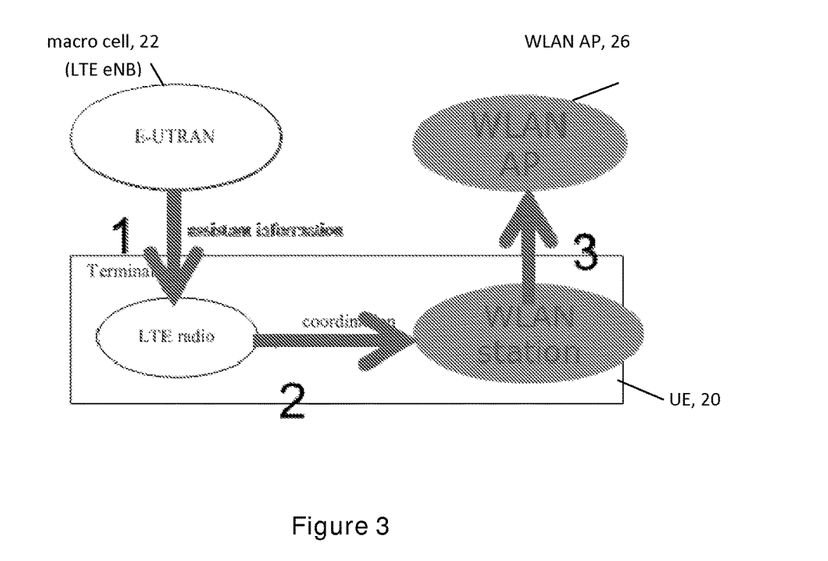
FIG. 3 is a high level signaling diagram illustrating an example procedure for WLAN station self-configured resource configuration control.
Figure 4:
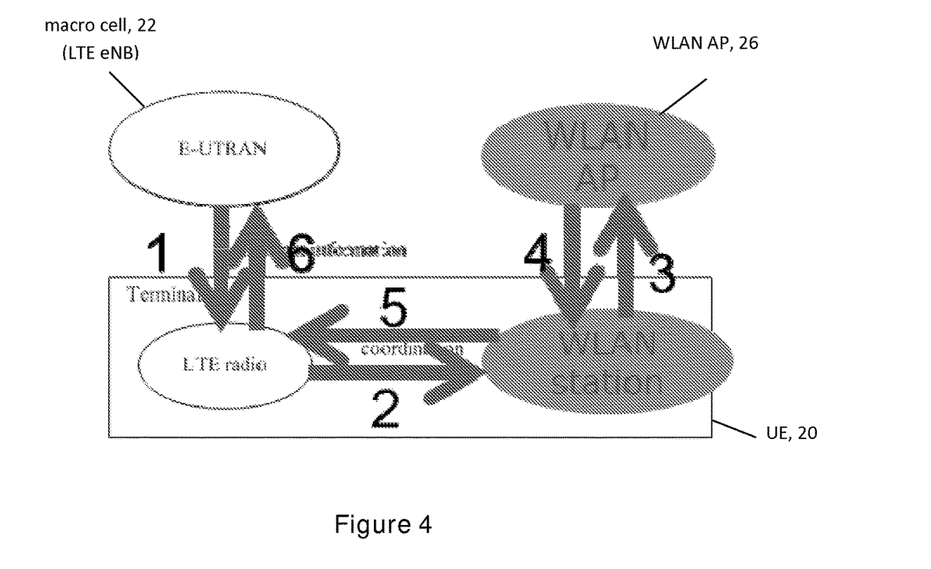
FIG. 4 is a high level signaling diagram illustrating an example procedure for WLAN AP resource control related signaling

Below are two distinct non-limiting examples for how these teachings may be implemented. The first example demonstrates WLAN station self-configured resource configuration control, such as bandwidth, MIMO and high modulation support configuration for which a detailed example of the signaling process is shown at FIG. 3. The second example demonstrates WLAN AP resource control related signaling for which a detailed example of the signaling process is shown at FIG. 4. In both cases, on the LTE eNB side embodiments of these teachings add signaling for assistance information and/or resource control commands to the LTE UE, which as noted above is connected both to the LTE eNB 22 and to the WLAN AP 26, to assist with WLAN radio resource management. In both cases there is also described further behavior at the LTE UE side in response to receiving that added signaling.

Consider the first example which concerns WLAN station self-configured resource configuration control (for example, bandwidth, MIMO and high modulation support configuration). According to an exemplary embodiment of these teachings the eNB 22 includes in a medium access control (MAC) control element (CE) a new information element (IE) for the configuration of bandwidth (and in certain implementations also other parameters) used to control the LTE UE's WLAN module's downlink reception and/or uplink transmission. As a non-limiting example such a new IE can be termed a CH_bandwidth_rx and/or a_CH_bandwidth_tx IE (where "rx" means receive and "tx" means transmit). In one implementation this new IE can be included in the existing activation/deactivation MAC CE; in another implementation it may be included in a whole new WLAN dedicated MAC CE; and in another embodiment it is not in a MAC CE but rather this new IE is sent in radio resource control (RRC) signaling or even in the L1 layer.

More specifically, the eNB 22 can in an embodiment preconfigure only a subset of the whole set of channels with this new IE. The eNB 22 can signal this new IE to a specific individual UE 20, or it can signal it once to a group of UEs such as those identified by a common group number.

Once the LTE UE 20 receives the signaling carrying this new IE for the WLAN STA self-configured resource configuration control, the LTE UE 20 triggers its WLAN module to make the commanded reconfiguration, and to report a change to the WLAN AP 26 in order to report the UE's configuration change in the WLAN side, for example using the existing VHT Operating Mode Notification Action frame.

Optionally, once the reconfiguration in the WLAN side is complete, the LTE UE 20 may send a newly defined WLAN-reconfigurationcomplete message back to LTE eNB 22, via LTE signaling.

FIG. 3 illustrates with a bit more particularity this example procedure for WLAN station self-configured resource configuration control. As step 1 of FIG. 3 the LTE eNB 22 will judge, by information such as the traffic load and/or the WLAN air-interface condition, a utilization status in the WLAN AP 26 to see what kind of air-interface data transmission is needed in the WLAN station 20. Then the number of active channels (from which the channel bandwidth can be readily determined) for the WLAN module of that specific UE 20 is determined. The channel bandwidth (CH_BANDWIDTH) can be selected from among the set {CBW20, CBW40, CBW80, CBW160 and CBW80+80}, according to the IEEE 802.11ac protocol as currently developed (see FIG. 2). The message signaled to the UE 20 in step 1 of FIG. 3 may be termed a reconfiguration message since it serves to reconfigured the UE's WLAN module. This reconfiguration message carries assistance information such as the above number of active channels or other information from which the UE 20 can determine the channel bandwidth. This reconfiguration message can, in an embodiment, also include additional information for configuring the UE's WLAN station module to configure by itself, such as a MIMO capability update (for example, selected from the set {8×8, 4×4, 2×2, 1×1}), and/or high modulation support (for example, 64QAM and/or 256QAM). The reconfiguration message is sent using the cellular/first RAT.

Step 2 shown at FIG. 3 is the UE's internal communications and coordination for the WLAN module reconfiguration information that the LTE UE received in Step 1, namely the LTE UE informs the UE's WLAN module about the reconfiguration request.

During step 3 of FIG. 3 the LTE UE's WLAN module triggers a VHT Operating Mode Notification Action frame to be sent to update the operating bandwidth and/or other parameters on the WLAN station side. For example, inside this notification action frame, there is a transmit vector txvector which the WLAN STA 20 should be set according to CH_bandwidth_tx, and the receive vector rxvector in this notification action frame should be set according to CH_bandwidth_rx. In this manner the LTE eNB 22 can control the WLAN transmissions by adapting the number of active channels, and thus adapting the bandwidth of the individual channels, used by the WLAN STA. These same steps in FIG. 3 can be used for the LTE eNB 22 to make other configuration changes to better suit its traffic needs and the air-interface condition, as well as loads on the WLAN AP 26 and other information the LTE eNB 22 might have available to assess how to best configure the WLAN.

Now with respect to FIG. 4 consider the second example which concerns WLAN AP resource control related signaling. According to an exemplary embodiment of these teachings the eNB 22 includes in a WLAN-dedicated medium access control (MAC) control element (CE) a new information element (IE) which in this description is termed RRM_control_WLANAP. For the configuration of bandwidth (and in certain implementations also other parameters) used to control the LTE UE's WLAN module's downlink reception and/or uplink transmission. In another embodiment this new IE is not in a MAC CE but rather is sent in RRC signaling or in the L1 layer signaling.

This IE also originates with the LTE eNB 22 and is sent using the LTE RAT to the UE 20. The LTE UE uses this received message to trigger its WLAN module to report these signaling parameters to WLAN AP 26 with which it is associated. FIG. 4 also shows the specific implementation in which the UE 20 additionally receives reports from the WLAN AP 26 and reports that WLAN information to the LTE eNB 22.

As with the first example above, for this second example for WLAN AP resource control related signaling, once the reconfiguration in the WLAN side is complete the LTE UE 20 may send a newly defined WLANreconfigurationcomplete message back to the LTE eNB 22 via LTE/$1^{st}$ RAT signaling.

FIG. 3 illustrates with a bit more particularity this example procedure for WLAN AP resource control related signaling, which is closed loop type signaling. At step1 of FIG. 4 the eNB 22 sends signaling to a particular UE 20 (or to a predefined group of UEs) which is connected to both that LTE eNB 22 and to a certain WLAN AP 26 under the control of the same network operator as the eNB 22; as mentioned above this control may be direct, or indirect such as through a networking partner.

The content of this message 1 of FIG. 4 is also assistance information for configuring/reconfiguring the WLAN, but in the case of this WLAN AP resource control related signaling the content is for the WLAN AP 26. Specifically, the assistance information in FIG. 4 can include any one or more of the following:

resource status, overload and traffic load to be transferred between networks (RATs);
collision rate under the AP;
traffic load status and QoS mapping;
interference status; and
an indicator on overall load status.

The content of the message at step 1 of FIG. 4 can additionally include one or more of the following:

a resource control command directed to the WLAN AP, such as a wake up/sleep command;
scanning channel index;
recommended beacon contents;
recommend WIFI (WLAN) operating bandwidth;
recommend MIMO operation capability;
recommend high modulation support; and
other parameters by which the eNB 22 controls the AP's 26 operation such as a recommended working channel, working rate, beacon interval, and the like.

Step 2 of FIG. 4 is in-device communication within the UE 20 in which the contents of the message at step 1 which is received by the UE's LTE radio is communicated to the UE's WLAN module. At step3 the content is communicated by the UE 20 as WLAN STA on the WLAN/$2^{nd}$ RAT to the WLAN AP 26. In one implementation this content is communicated in the WLAN in a new control frame termed a 3GPP_assistance_info action frame, which can be defined in IEEE WLAN protocols for this purpose. Alternatively the UE's WLAN module can send this content on the $2^{nd}$ RAT/WLAN as data packets without any special message protocol which the WLAN AP 26 can interpret conventionally.

The remainder of FIG. 4 is the closed feedback loop. In step4 the WLAN AP 26 replies to the UE 20 WLAN module using for example a new control frame feedback_to_3GPP action frame, also to be defined in IEEE protocols, acknowledging receipt of and its adoption of the configuration information it received in the message at step 3. This confirms that the WLAN AP 26 has in fact configured the WLAN according to the content that originated with the LTE eNB 22. Alternatively the WLAN AP 26 can send this reply at step 4 as data packets which the WLAN STA 20 can interpret conventionally.

At step5 the WLAN module of the UE 20 communicates the WLAN AP's feedback it received to the LTE radio of the UE 20 using in-device communication. And finally at step 6 the LTE radio of the UE 20 forwards the feedback originated by the WLAN AP 26 to the LTE eNB 22 via uplink on the $1^{st}$ RAT/LTE.

Embodiments of these teachings provide the technical effect of enabling the LTE eNB 22 to assist the WLAN AP 26 (or Aps when the above procedures are extended to more than one) to make better radio resource management decisions and to maintain a greater power efficiency, with the assistance from LTE UE 20 (or UEs). A particular advantage is that there is no requirement to have a backhaul interface between the LTE eNB 22 and the WLAN APs 26, which can help reduce the network operator' infrastructure investment costs.

Figure 5:
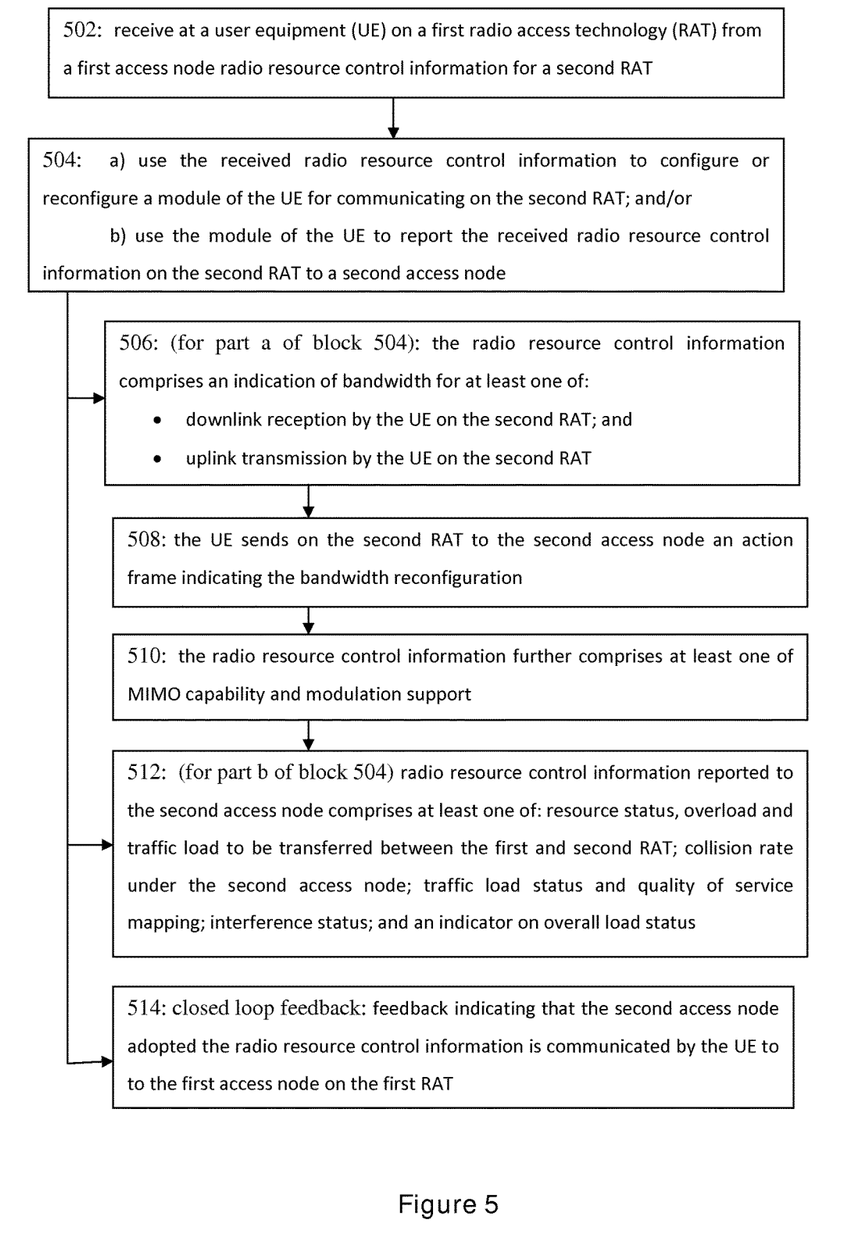
FIG. 5 is a logic flow diagram that illustrates a method for operating a user equipment/UE, and a result of execution by an apparatus of a set of computer program instructions embodied on a computer readable memory for operating such a UE, in accordance with certain exemplary embodiments of this invention.

FIG. 5 presents a summary of the above teachings for controlling and/or for operating a user equipment (UE) 20 such as for example one capable of operating in a UTRAN or LTE or LTE-Advanced (LTE-A) network as well as in a WLAN network; or more generally in both first and second RATs. At block 502 the UE 20 receives on a first radio access technology (RAT) from a first access node radio resource control information for a second RAT. Then at block 504 the UE performs at least one of the following: a) it uses the received radio resource control information to configure or reconfigure a module of the UE for communicating on the second RAT; and b) it uses the module of the UE to report the received radio resource control information on the second RAT to a second access node. Part a) refers to the WLAN station self-configured resource configuration control detailed by example with respect to FIG. 3 (e.g., the UE uses the radio resource control information to self-configure its WLAN module for the indicated bandwidth in the FIG. 3 example), whereas part b) refers to the WLAN AP resource control related signaling which is detailed by example with respect to FIG. 4.

In the examples above the first RAT is a universal radio terrestrial access network (UTRAN) or an evolved UTRAN (E-UTRAN) and the second RAT is wireless local area network (WLAN).

Some of the non-limiting implementations detailed above are also summarized at FIG. 5 following block 504. Block 506 relates to part a) of block 504, and block 506 specifies that the radio resource control information comprises an indication of bandwidth for at least one of downlink reception by the UE on the second RAT, and uplink transmission by the UE on the second RAT. In the above more specific FIG. 3 example the indication was one or both of a CH-bandwidth_rx information element and a CH-bandwidth_tx information element.

Block 508 of FIG. 5 specifies an additional step for the UE-self-configuring embodiment in which the UE sends on the second RAT to the second access node an action frame indicating the bandwidth reconfiguration. Block 510 summarizes some other information that the radio resource control information might include, such as for example one or both of multi-input/multi-output (MIMO) capability, and modulation support.

Blocks 510 and 512 of FIG. 5 relate to the second embodiment where the RRC signaling is related to controlling the WLAN AP, which is part b) of block 504. In this case the content of the message, which is the radio resource control information that the UE reports to the second access node, is summarized at block 510 as including any one or more of:

resource status, overload and traffic load to be transferred between the first and second RAT;
collision rate under the second access node;
traffic load status and quality of service mapping;
interference status; and
an indicator on overall load status.

As shown above with respect to the second example and FIG. 4, the content of the message carrying the radio resource control information that is reported to the second access node can in some embodiments also include at least one of:

a wake up or sleep command directed to the second access node;
a scanning channel index;
recommended beacon contents;
recommend operating bandwidth for the second RAT;
recommend MIMO operation capability;
recommend high modulation support;
recommended working channel;
recommended working rate; and
recommended beacon interval.

Block 514 specifies that the UE's module receives feedback from the second access node on the second RAT in reply to the reporting stated at block 504 part b), and in this embodiment the feedback indicates that the second access node had adopted the radio resource control information. Block 514 completes the closed loop feedback in that the UE then communicates the feedback to the first access node on the first RAT.

For either of the examples above there may be an additional step in that the UE sends to the first access node on the first RAT a reconfiguration complete message which indicates that the second RAT is configured or reconfigured according to the received radio resource control information.

The logic diagram of FIG. 5 may be considered to illustrate the operation of a method, and a result of execution of a computer program stored in a computer readable memory, and a specific manner in which components of an electronic device are configured to cause that electronic device to operate, whether such an electronic device is the UE or some other portable electronic device that is connected to both the first and second access nodes via the respective first and second RATs, or one or more components thereof such as a modem, chipset, or the like. The various blocks shown in FIG. 5 may also be considered as a plurality of coupled logic circuit elements constructed to carry out the associated function(s), or specific result of strings of computer program code or instructions stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Such circuit/circuitry embodiments include any of the following: (a) hardware-only circuit implementations (such as implementations in only analog and/or digital circuitry) and (b) combinations of circuits and software (and/or firmware), such as: (i) a combination of processor(s) or (ii) portions of processor(s)/software (including digital signal processor(s)), software, and memory(ies) that work together to cause an apparatus, such as a user equipment/UE, to perform the various functions summarized at FIG. 5 and (c) circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" also covers, for example, a baseband integrated circuit or applications processor integrated circuit for a user equipment UE or for a network access node/eNB or a similar integrated circuit in a server or other network device which operates according to these teachings.

Reference is now made to FIG. 6 for illustrating a simplified block diagram of various electronic devices and apparatus that are suitable for use in practicing the exemplary embodiments of this invention. In FIG. 6 an eNB 22 is adapted for communication over a wireless link 21A with an apparatus, such as a mobile terminal or UE 20. The eNB 22 may be any access node (including frequency selective repeaters) of any wireless network using licensed bands, such as LTE, LTE-A, GSM, GERAN, WCDMA, and the like. The operator network of which the eNB 22 is a part may also include a network control element such as a mobility management entity MME and/or serving gateway SGW 24, or radio network controller RNC in the case of a UTRAN, either of which provide connectivity with the core cellular network and with further networks (e.g., a publicly switched telephone network PSTN and/or a data communications network/Internet).

The UE 20 includes processing means such as at least one data processor (DP) 20A, storing means such as at least one computer-readable memory (MEM) 20B storing at least one computer program (PROG) 20C, first communication means such as a transmitter TX 20D and a receiver RX 20E for bidirectional wireless communications with the eNB 22 over the first RAT (E-UTRAN, UTRAN, etc.), and second communication means such as a transmitter TX 20'D and a receiver RX 20'E for bidirectional wireless communications with the second access node/WLAN AP 26 over the second RAT (WLAN, WiFi, HiperLAN, Zigbee, etc.). All of these wireless communications are via one or more antennas 20F. Also stored in the MEM 20B at reference number 20G are the algorithms or look-up tables which enable the UE 20 to use the RRC information it receives from the eNB 22 to reconfigure itself for WLAN communications according to the first embodiment above, or to use its internal communications so that the RRC information received at the UE on the first RAT can be sent by the UE on the second RAT via its WLAN module (the UE's WLAN module is represented in FIG. 6 as the $2^{nd}$ RAT TX/DX 20'D/E) according to the second embodiment. Those embodiments are described in further detail above.

The eNB 22 also includes processing means such as at least one data processor (DP) 22A, storing means such as at least one computer-readable memory (MEM) 22B storing at least one computer program (PROG) 22C, and communication means such as a transmitter TX 22D and a receiver RX 22E for bidirectional wireless communications with the UE 20 on the first RAT via one or more antennas 22F. The eNB 22 stores at block 22G its own algorithms/look-up tables for gathering the network load and air interface information and determining from that how best to configure the WLAN, which is put into effect via the RRC information communicated to the UE 20.

Also at FIG. 6 is shown a WLAN AP 26 as a specific implementation of the second access node operating on the second RAT. The WLAN AP 26 includes processing means such as at least one data processor (DP) 26A, storing means such as at least one computer-readable memory (MEM) 26B storing at least one computer program (PROG) 26C, and communication means such as a transmitter TX 26D and a receiver RX 26E for bidirectional wireless communications with the UE 20 on the second RAT via one or more antennas 26F. The WLAN AP 26 stores at block 26G its own algorithms/look-up tables for configuring the WLAN according to the RRC information it receives from the UE 20 according to the various embodiments detailed above, whether it be channel bandwidth, sleep/wakeup command, beacon interval, and/or any of the other configuration parameters detailed above with respect to FIGS. 3-4.

While not particularly illustrated for the UE 20 or either of the first 22 or second 26 access nodes, those devices are also assumed to include as part of their wireless communicating means a modem and/or a chipset which may or may not be inbuilt onto an RF front end chip within those devices 20, 22, 26 and which also operates according to the respective first and second RATs as set forth above.

At least one of the PROGs 20C in the UE 20 is assumed to include a set of program instructions that, when executed by the associated DP 20A, enable the device to operate in accordance with the exemplary embodiments of this invention, as detailed above. The eNB 22 also has software stored in its MEM 22B to implement certain aspects of these teachings such as using the information it gathers about network load and interference/air interface condition to choose how to configure the WLAN. Further, the WLAN AP 26 may also have implementing software to put into effect the teachings herein as detailed above. In these regards the exemplary embodiments of this invention may be implemented at least in part by computer software stored on the MEM 20B, 22B which is executable by the DP 20A of the UE 20 and/or by the DP 22A of the eNB 22, and/or by the DP 26A of the WLAN AP 26; or by hardware, or by a combination of tangibly stored software and hardware (and tangibly stored firmware) in any one or more of these devices 20, 22, 26. Electronic devices implementing these aspects of the invention need not be the entire devices as depicted at FIG. 6 or may be one or more components of same such as the above described tangibly stored software, hardware, firmware and DP, or a system on a chip SOC or an application specific integrated circuit ASIC.

In general, the various embodiments of the UE 20 can include, but are not limited to personal portable digital devices having wireless communication capabilities, including but not limited to cellular and other mobile phones, navigation devices, laptop/palmtop/tablet computers, digital cameras and music devices, and Internet appliances.

Various embodiments of the computer readable MEMs 20B, 22B, 26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A, 26A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the LTE/LTE-A (or UTRAN) and WLAN systems, as noted above the exemplary embodiments of this invention are not limited for use with only these particular types of wireless radio access technology networks.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. A method for controlling a user equipment (UE), comprising:
   receiving at the UE on a first radio access technology (RAT) from a first access node radio resource control information for a second RAT;
   using the received radio resource control information to configure or reconfigure a resource or processing capability of a module of the UE for communicating on the second RAT;
   using the module of the UE to report the received radio resource control information on the second RAT to a second access node to configure or reconfigure a network of the second access node; and
   communicating, by the UE to the first access node on the first RAT, feedback from the second access node that the second access node has adopted the radio resource control information.

2. The method according to claim 1, wherein the first RAT is a universal radio terrestrial access network (UTRAN) or an evolved UTRAN (E-UTRAN) and the second RAT is wireless local area network (WLAN).

3. The method according to claim 1, wherein the first RAT and the second RAT comprise two different radio access technologies from two of the following:
   IEEE 802.11 family of radio protocols;
   universal terrestrial access network (UTRAN) family of radio protocols;
   evolved UTRAN (E-UTRAN) family of radio protocols;
   global system for mobile communications (GSM) enhance data rates for GSM evolution (EDGE) radio access network (GERAN) family of radio protocols;
   worldwide interoperability of microwave access (Wimax) family of radio protocols; and
   Bluetooth family of radio protocols.

4. The method according to claim 1, wherein the first RAT is a $3^{rd}$ generation partnership project (3GPP) RAT and the second RAT is a non-3GPP RAT.

5. The method according to claim 1, wherein a) the received radio resource control information is used to configure or reconfigure the module of the UE; and
where the radio resource control information comprises an indication of bandwidth for at least one of:
   downlink reception by the UE on the second RAT; and
   uplink transmission by the UE on the second RAT.

6. The method according to claim 5, wherein the UE uses the radio resource control information to self-configure the module for the indicated bandwidth.

7. The method according to claim 5, wherein the indication comprises at least one of a CH-bandwidth_rx information element and a CH-bandwidth_tx information element.

8. The method according to claim 5, the method further comprising:
   the UE sending on the second RAT to the second access node an action frame indicating the bandwidth reconfiguration.

9. An apparatus for controlling a user equipment (UE), the apparatus comprising a processing system which comprises at least one processor and a memory storing a set of computer instructions,
   where, in response to receiving at the UE on a first radio access technology (RAT) from a first access node radio resource control information for a second RAT, the processing system is configured to cause the apparatus to perform:
   using the received radio resource control information to configure or reconfigure a resource or processing capability of a module of the UE for communicating on the second RAT; and
   using the module of the UE to report the received radio resource control information on the second RAT to a second access node to configure or reconfigure a network of the second access node; and
   communicating, to the first access node on the first RAT using the UE, feedback from the second access node that the second access node has adopted the radio resource control information.

10. The apparatus according to claim 9, wherein the first RAT is a universal radio terrestrial access network (UTRAN) or an evolved UTRAN (E-UTRAN) and the second RAT is wireless local area network (WLAN).

11. The apparatus according to claim 9, wherein the first RAT and the second RAT comprise two different radio access technologies from two of the following:
   IEEE 802.11 family of radio protocols;
   universal terrestrial access network (UTRAN) family of radio protocols;
   evolved UTRAN (E-UTRAN) family of radio protocols;
   global system for mobile communications (GSM) enhance data rates for GSM evolution (EDGE) radio access network (GERAN) family of radio protocols;
   worldwide interoperability of microwave access (Wimax) family of radio protocols; and
   Bluetooth family of radio protocols.

12. The apparatus according to claim 9, wherein the first RAT is a $3^{rd}$ generation partnership project (3GPP) RAT and the second RAT is a non-3GPP RAT.

13. The apparatus according to claim 9, wherein a) the received radio resource control information is used to configure or reconfigure the module of the UE; and
where the radio resource control information comprises an indication of bandwidth for at least one of:
   downlink reception by the UE on the second RAT; and
   uplink transmission by the UE on the second RAT.

14. The apparatus according to claim 13, wherein the UE uses the radio resource control information to self-configure the module for the indicated bandwidth.

15. The apparatus according to claim 13, wherein the indication comprises at least one of a CH-bandwidth_rx information element and a CH-bandwidth_tx information element.

16. The apparatus according to claim 13, wherein the processing system is configured to cause the apparatus to further cause the UE to send on the second RAT to the second access node an action frame indicating the bandwidth reconfiguration.

17. A computer readable memory tangibly storing a set of computer executable instructions for controlling a user equipment (UE), the set of computer executable instructions being executable in response to receiving at the UE on a first radio access technology (RAT) from a first access node radio resource control information for a second RAT;
the set of computer executable instructions comprising:
   code for using the received radio resource control information to configure or reconfigure a resource or processing capability of a module of the UE for communicating on the second RAT; and
   code for using the module of the UE to report the received radio resource control information on the second RAT to a second access node to configure or reconfigure a network of the second access node on the second RAT; and
   code for communicating, via the UE to the first access node on the first RAT, feedback from the second access node that the second access node has adopted the radio resource control information.

18. The computer readable memory according to claim 17, wherein the first RAT is a universal radio terrestrial access network (UTRAN) or an evolved UTRAN (E-UTRAN) and the second RAT is wireless local area network (WLAN).

19. The computer readable memory according to claim 17, wherein the first RAT and the second RAT comprise two different radio access technologies from two of the following:
   IEEE 802.11 family of radio protocols; universal terrestrial access network (UTRAN) family of radio protocols;
   evolved UTRAN (E-UTRAN) family of radio protocols;
   global system for mobile communications (GSM) enhance data rates for GSM evolution (EDGE) radio access network (GERAN) family of radio protocols;
   worldwide interoperability of microwave access (Wimax) family of radio protocols; and
   Bluetooth family of radio protocols.

20. The computer readable memory according to claim 17, wherein the first RAT is a 3$^{rd}$ generation partnership project (3GPP) RAT and the second RAT is a non-3GPP RAT.

\* \* \* \* \*